Patented Jan. 14, 1947

2,414,117

UNITED STATES PATENT OFFICE 2,414,117

THICKENING AGENT FOR AQUEOUS COMPOSITIONS AND METHOD OF PRODUCING SAME

Sidney Musher, New York, N. Y., assignor to Musher Foundation Incorporated, New York, N. Y., a corporation of New York No Drawing. Application May 4, 1944, Serial No. 534,166

12 Claims. (Cl. 252—1)

1

The present invention relates to thickened, viscous and stabilized aqueous compositions having unusual physical stabilizing characteristics and also to the production of gelatinous or gummy masses or compositions.

In thickening aqueous compositions it has been customary to use materials such as dextrine or British gum or other preparations such as gum tragacanth, gum karaya, India gum, etc., which are for the most part solidified exudations from various tropical trees, plants or shrubs.

These various gummy or water thickening materials are very expensive and tend to vary greatly in uniformity and purity.

Among the objects of the present invention is to provide thickened and stabilized aqueous compositions such as food and pharmaceutical compositions as ice cream, sherbets and ices, for cream cheese and other dairy products, for candies and confections, icings, fruit jellies and jams, sausage, as well as industrial compositions such as textile sizings, thickened printing inks or printing compositions, cosmetics, etc.

Still further objects and advantages will appear from the more detailed description set forth below, it being understood, however, that this more detailed description is given by way of illustration and explanation only, and not by way of limitation since various changes therein may be made by those skilled in the art without departing from the scope and spirit of the present invention.

In accordance with the present invention, it has been found that in contrast to other cereals, when a special fraction of oats has been properly separated from the oat grain and specially extracted, it may be used to develop unusual stabilizing, gelatinous, gummy or thickening characteristics.

These stabilizing, thickening or gummy properties are not developed to the same extent in the extracts of the oat grain as a whole or in ordinary oat products as, for example, in oat flour as made by grinding oat groats or in pulverized oats or oat hulls. These properties are particularly developed when a special fraction of the oat grain is removed from the balance of the oat grain and specially extracted.

This special oat fraction is a relatively low starch, relatively high protein fraction which may be obtained after removal of the cellulosic hulls of the oats and after removal of a large portion of the relatively high starch fraction.

This particular fraction of oats is best prepared by first milling the oats to remove the cellulosic hulls leaving the oat groats. These oat groats are then treated to remove the relatively high starch fraction and to concentrate the relatively high protein fraction thereof, obtaining a fraction which contains in excess of 20% protein and most desirably in excess of 22% protein.

In treating these oat groats, the groats are pulverized or ground to such an extent that at least 50% and desirably 80% to 90% will pass through a screen or mesh or bolting cloth having a fineness in excess of 60 mesh and desirably in excess of 70 mesh. The oat groats are ground as indicated above and the ground oats are then separated by aspirating into two fractions, namely, a coarse fraction and a fine fraction, the coarse fraction comprising the minor fraction of less than 50% by weight and most desirably comprising 10% to 20% of the total weight of the ground oat groats and the fine fraction comprising over 50% and desirably between 80% and 90% of the total weight of the ground oat groats.

It is the coarse residue which is left after such grinding and screening or bolting or after aspirating which is found to contain the properties most desirable for extraction in accordance with the procedures of the present invention. Where desired, the coarse residue may, before extraction, be finely divided as by grinding or other pulverizing to a fineness of 50 to 60 mesh.

This full effect is not evident or evidenced when the whole oats are ground and utilized for extraction as such or when the oat flour made by grinding oat groats is utilized as such because of the fact that other constituents therein greatly lessen, diminish or render ineffective the unusual stabilizing or gummy properties of the relatively high protein relatively low starch containing dehulled oat fraction of the present invention.

In the preferred procedure, the oat groats, after removal of the hulls by milling processes, are pulverized or ground and then by aspirating, bolting or screening, the relatively high starch containing oat fraction is removed. The pulverized oat groats may, for example, be aspirated to separate the minor fraction of the relatively low starch and relatively high protein containing materials. This process may where desired be continued by regrinding, rescreening or reaspirating until the relatively high starch material has been largely removed leaving the relatively high protein fraction behind.

The coarse fraction obtained will have a protein content in excess of 20% and most desirably in excess of 22%. At the same time the starch content of the coarse fraction will be less than the starch content of the fine fraction.

According to one preferred method of separating the relatively high starch fraction, the groats are ground or pulverized or otherwise finely divided so that a major proportion thereof, say at least 50% to 80%, will have a fineness in excess of about 60 mesh and desirably at least 60% to 70% of the finely divided material will have a sufficient fineness to go through an 80 to 90 mesh screen. Then the ground material is screened, preferably through a fine silk screen, or aspirated to remove all particles which will not go through a 60 mesh screen.

A most highly desirable method is to grind or pulverize the oat groats until over 75%, such as between 75% and 95% and desirably between 80% and 90% will go through a 70 mesh screen but wherein the balance of between 5% and 25% and desirably between 10% and 20% remains on the screen. Then the ground groats are aspirated or screened to remove all the coarse particles and to separate the fine fraction comprising 75% to 95% and desirably 80% to 90% from the coarse fraction comprising the balance of 5% to 25% and desirably 10% to 20% which coarse fraction is used in accordance with the procedures of the present invention.

The oat material which goes through the screen or the fine material which is aspirated will contain the relatively high starch fraction whereas the material left behind on the screen or the coarse fraction thereof will be relatively low in starch content as compared to dehulled oats.

This coarse, relatively low starch and relatively high protein material is desirably finely divided and may then be used for extraction in accordance with the procedures of the present invention.

The unusual effects given by this particular fraction of oats is not given by any other fraction of oats or any other type of cereal or its fractions including wheat or its fractions, corn or its fractions, barley or its fractions, rye or its fractions, rice or its fractions, or other types of cereals.

Although the chemical composition of the coarse fraction may vary it has been found that at least 20% protein should be present and desirably at least 22% protein although very desirable materials have been made containing 25% to 29% protein.

It has been found possible, where desired, to bleach this special oat fraction with chlorine or hypochlorite to eliminate the dark specks. It is also possible to obtain this bleaching effect with reducing agents such as sulfites but these reducing agents are not as effective as the oxidizing bleaching agents.

The special oat fraction is then agitated with a combination of water and an alcohol, the alcohol being present in an amount of 1 to 7 parts and desirably 1 to 3 parts to each 10 parts of water. The special oat fraction is agitated in the water-alcohol mixture for at least several minutes and desirably for a period of 30 minutes to 3 hours at room temperature followed by clarification to remove the gummy and gelatinous water soluble principles therefrom.

This removal may be greatly hastened by heating the water-alcohol combination to between 100° F. and 150° F. and preferably within the range of 115° F. to 125° F., using from about 4 to 8 parts or more of the water-alcohol combination to each part of the special oat fraction by weight.

After the water soluble gummy principles have been removed, as by decanting, centrifuging or clarification by filtration, the extracted portion may be evaporated or condensed, desirably by concentration in a vacuum pan at a temperature not over 140° F. to over 30% and desirably to over 50% total solids.

The concentrated extract may then be dried by exposure on trays to a current of heated air or by other ordinary drying means followed by grinding or pulverizing the dried extract to at least about 40 mesh and preferably to over 50 mesh.

The special oat fraction may also be agitated with water alone at a temperature under about 90° F. and most preferably under 70° F. for a period from several minutes to about 30 minutes followed by clarification to remove the gummy and gelatinous water soluble principles from the oat fraction, using from about 4 to 12 parts and preferably 6 to 12 parts of water to each part of the special oat fraction. After the solution of the water soluble gummy principles have been removed, as by decanting, centrifuging or clarification by filtration, the solution may be evaporated and condensed to about 8% to 30% total solids. This solution or extract is added to a trough or tank containing, the trough or tank preferably being fitted with a screen. At least about 50% alcohol and preferably about 60% to 70% should be present to obtain the proper reaction. The gummy principles will then be precipitated out from the alcoholic solution in a rubbery, plastic, stringy mass which can readily be removed from the alcoholic solution. The precipitated gum portion may then be removed from the alcohol by filtration or lifting of the screen. For example, the stringy mass may be redissolved in water and, where desired, the solution may be bleached with chlorine or hypochlorite solution.

The preferred alcohol is isopropyl alcohol although other alcohols may be used, particularly those having the formula XOH where X is a low molecular weight aliphatic radical. Among the alcohols used are methyl, ethyl, propyl, isopropyl, or butyl alcohols. Other water soluble solvents may much less preferably be used in place of the alcohol such as acetone, ethyl acetate, etc.

It has been found desirable that the water or water-alcohol extraction medium should be acidified so that it will have a pH less than 8 and desirably above 3 and preferably in a range of 5.5 to 6.9, the acidity being adjusted by the addition of an organic or inorganic acid, such as hydrochloric, sulfuric, phosphoric, tartaric or similar acid.

The gummy and gelatinous principles may be removed, dried and ground with or without the addition of carriers, such as sucrose, dextrose, skim milk powder, whey powder, starch, cereal flours, salt and other similar materials before, during or after drying and/or grinding.

Desirably, these inert materials which are added to keep the ground gum particles apart should not be added in greater quantities than about 10% to 50%.

In certain instances, however, it may be desirable to remove the non-gummy, water soluble materials from the special oat fraction and leave the gummy or gelatinous principles with the special oat fraction in which case the concentration of alcohol in the water should preferably be increased to in excess of about 40% and desirably in excess of 50%.

For example, in such extractions from 4 parts of water or less are mixed with 3 parts or more of isopropyl or other alcohol, the mixture being used to extract 1 to 3 parts of the special oat fraction.

There will be left with the residue the gummy and gelatinous principles, while the water soluble materials which are soluble in water and alcohol mixtures of greater than 40% alcohol concentration will be removed.

If desired, this residue may be used as such with or without bleaching, or on the other hand, the residue may be extracted with water preferably in acidified condition and then the gummy and gelatinous principles may be precipitated with alcohol, or the residue may be extracted with a water alcohol mixture containing at least 60% to 70% water.

These gummy and gelatinous principles which are precipitated by the addition of alcohol to the water extract may be dried into hard or horny masses, which are finely ground and preferably combined with other materials which also may be soluble in hot or cold water, such as sugar.

The extracted gummy material appears to be quite different from starch or dextrine in that it will not give a blue test with iodine characteristic of starch, or the red brown test with iodine characteristic of dextrine.

The special oat fraction may, where desired, be first extracted with hexane or other fat solvent and then used as such or extracted as indicated above to remove the gummy principles.

The extract of the special oat gum fraction may be readily employed in textile or paper sizing, in thickening pastes or textile inks, in chocolate milk or in ice cream, in mayonnaise or in salad dressing as an emulsifying agent, in mineral oil or glyceride oil emulsions for pharmaceutical or food purposes, in adhesive paste or gum compositions, for preparation into pellets of varying shapes or sizes and with or without toasting to be taken for laxative purposes, etc.

It has been found that when the extracts prepared in accordance with the procedures of the present invention are suspended in water or similar aqueous medium with or without short or prolonged heating, an unusual thickening, gelatinous and gummy suspension is formed having many useful properties and which may be used as a thickening or stabilizing agent or gum in food products, pharmaceutical products, as a sizing for paper and textiles or as a stabilizing agent in physical two phase systems. For example, as little as 0.1% to 5% of the extracts dispersed in water or similar aqueous medium is sufficient to show the physical stabilizing characteristics and the particularly unusual gummy and stabilizing properties.

The extracts of the present invention which have most desirably been finely divided may be added to a composition to stabilize the same and to produce a gelatinous, gummy and similar effect, the addition being made in the amount of between 0.05% and 10% and desirably between 0.1% and 2%.

In the manufacture of ice cream, for example, where there is used between 0.2% and 1% of gelatin, sodium alginate, algin, Irish moss or similar stabilizer, there may be employed between 0.3% and 1% of the extract herein described to retard ice and lactose crystal formation, to give excellent body and texture and physical characteristics producing an ice cream of high score and stabilization.

In the manufacture of icings, the extract produced in accordance with the present invention and which desirably has been finely divided may be added to the icing composition in an amount of less than about 2% in lieu of pectin, algin, gelatin, or similar stabilizer.

In the manufacture of cream cheese, the extract may be used in an amount of between 0.5% and 1.5% in replacement for locust bean gum to retard syneresis, to give stabilization and fine body and texture to the cream cheese.

In the manufacture of candies and confections the extract may be used in chocolate coatings, gum drops, cream and marshmallow fillings, as well as for other candy and confectionery products to give unusual thickening and stabilization characteristics.

The extract may also be utilized for bakery purposes such as for pie fillings, custards and puddings.

The extract of the present invention may be used in the preparation of cosmetics as for hand lotions, face creams, for baths or for application where a high viscosity and adhesiveness are desired. For example, from 0.5% to 15% of the extract may be dispersed in water preferably with agitation and used as a batch for cosmetic or dermatological purposes.

Similarly in the manufacture of pharmaceutical emulsions and cosmetic preparations the extract may be employed in place of the expensive gums to give high stabilization characteristics. For example, from 0.5% to 15% of the extract of the present invention may be used in the preparation of hand lotions, facial or skin creams or lotions, foot-ease powders or other cosmetic preparations.

Furthermore, in printing inks the present composition may be employed to provide a medium of high viscosity to use as a carrier for inks and in the textile industry may be employed to deepen the color of the textile and to provide good body characteristics.

Where used for pharmaceutical preparations there may be obtained with the dispersed special oat fraction such products as zinc stearate, lanolin, or in connection with such products or other pharmaceutical or dermatological products there may be combined therewith bactericidal or fungicidal agents such as thymol, sodium benzoate, etc.

Still further and unusual results are obtained by first extracting the fat from the special oat fraction before extraction such as by treatment of the oat fraction or the finely divided oat fraction with a fat solvent such as the volatile hydrocarbon oils such as hexane or petroleum ether, acetone, carbon tetrachloride, ethylene dichloride or similar fat solvent or, less preferably, either an alcohol such as methyl alcohol, ethyl alcohol, propyl alcohol, isopropyl alcohol or combinations of any of the above.

The residue which is obtained following this extraction procedure and following removal of the fat has been found to be highly advantageous for further extraction in accordance with the procedures of the present invention.

By the term "aqueous composition" as used in the present application and claims is meant a composition which contains a large proportion of water and preferably a major proportion of over 50% of water. There are particularly included those compositions which are fluid at room temperature.

Where desired, there may be combined with the extract of the present invention mono-glycerides or di-glycerides.

Where desired, the special oat fraction may be finely divided as by grinding or pulverizing to at least about 40 to 50 mesh before extracting in accordance with the procedures outlined herein.

The present application is a continuation in part of application Serial No. 401,967, entitled "Water thickening agent," filed July 11, 1941.

The present application is also a continuation in part of application, Serial No. 510,831, now Patent No. 2,355,028, issued August 1, 1944, and application, Serial No. 534,164, now Patent No. 2,355,029, issued August 1, 1944.

Having described my invention, what I claim is:

1. A gummy gelatinous, water extract of the finely divided coarse fraction of dehulled oats, said finely divided coarse fraction being substantially free of those particles which will go through a 60 mesh screen when the dehulled oats are pulverized to a fineness that will permit a major proportion thereof to pass through a 60 mesh screen, said finely divided coarse fraction containing in excess of about 20% total protein and said finely divided coarse fraction having a relatively low starch and a relatively high protein content as compared to dehulled oats, said extract being completely water soluble and being devoid of insoluble residues.

2. A gummy gelatinous, water soluble extract of the finely divided coarse fraction of dehulled oats, said finely divided coarse fraction being substantially free of those particles which will go through a 60 mesh screen when the dehulled oats are pulverized to a fineness that will permit a major proportion thereof to pass through a 60 mesh screen, said extract being completely water soluble and being devoid of insoluble residues.

3. A gummy gelatinous, water soluble extract of the finely divided coarse fraction of dehulled oats, said finely divided coarse fraction being substantially free of those particles which will go through a 60 mesh screen when the dehulled oats are pulverized to a fineness that will permit about 80% to 90% thereof to pass through a 60 mesh screen, said extract being completely water soluble and being devoid of insoluble residues.

4. A method of producing from oats a thickening agent for aqueous compositions which comprises dehulling oats, grinding the groats until a major proportion thereof will have a fineness in excess of about 60 mesh, separating the minor proportion of coarser particles away from the major proportion of fine particles and then extracting the coarser particles with a water-alcohol mixture comprising at least 5 parts of water to each part of the alcohol and then separating the water-alcohol soluble fraction, the said water-alcohol soluble fraction constituting the thickening agent.

5. A method of producing a thickening agent for aqueous compositions which comprises dehulling oats, grinding the groats until a major proportion thereof will have a fineness in excess of about 60 mesh, separating the coarser particles which have a fineness of under about 60 mesh, extracting these coarser particles with a water-alcohol mixture comprising at least about 5 parts of water to each part of alcohol to remove an extract free of residues, concentrating said extract, agitating said concentrated extract with an alcohol water mixture where the alcohol is present in at least an equal amount with water, removing the precipitated residues, drying said residues, and then grinding the dried extracted material.

6. A method of producing a thickening agent for aqueous compositions which comprises milling oats to remove the hulls and obtain oat groats, grinding the groats until a major proportion thereof, ranging from 50% to 80%, will have a fineness in excess of 60 mesh and until at least 60% to 70% of the ground groats will have a fineness between 90 and 100 mesh, screening the ground groats to remove all particles which will go through a 90 to 100 mesh screen, and extracting the said coarser particles with an acidified water-alcohol mixture comprising at least 5 parts of water to each part of the alcohol at a temperature of 100° F. to 150° F. with from 4 to 8 parts of the water-alcohol mixture to each part of the coarse particles to remove an extract containing said thickening agent free of residues.

7. A method of producing a thickening agent for aqueous compositions which comprises extracting the coarse fraction of dehulled oats with a water-alcohol mixture comprising at least 5 parts of water to each part of the alcohol and with from about 4 to 8 parts of the water-alcohol mixture to each part of the coarse fraction to remove an extract containing said thickening agent free of residues, the said coarse fraction of dehulled oats being substantially free of those particles which will go through a 60 mesh screen when the dehulled oats are pulverized to a fineness that will permit a major proportion thereof to pass through a 60 mesh screen, said coarse fraction containing in excess of about 20% total protein and having a relatively low starch and a relatively high protein content as compared to dehulled oats.

8. A method of producing from oats a thickening agent for aqueous compositions which comprises dehulling oats, grinding the groats until a major proportion thereof will have a fineness in excess of about 60 mesh, separating the minor proportion of coarser particles away from the major proportion of fine particles and then extracting the coarser particles with a water-alcohol mixture comprising 1 to 7 parts of an alcohol to each 10 parts of water, and then separating the water-alcohol soluble fraction, the said water-alcohol fraction constituting the thickening agent.

9. A method of producing a thickening agent for aqueous compositions which comprises dehulling oats, grinding the groats until 80% to 90% thereof will have a fineness in excess of about 60 mesh, separating the coarser particles which have a fineness of under about 60 mesh, extracting these coarser particles with a water-alcohol mixture comprising 1 to 7 parts of an alcohol to each 10 parts of water to remove an extract free of residues, concentrating said extract, agitating said concentrated extract with an alcohol-water mixture where the alcohol is present in at least an equal amount with water, removing the precipitated residues, drying said residues, and then grinding the dried extracted material.

10. A method of producing a thickening agent for aqueous compositions which comprises milling oats to remove the hulls and obtain oat groats, grinding the groats until a major proportion thereof will have a fineness in excess of about 60 mesh, separating the ground groats to remove all particles which will go through a 60 mesh screen, extracting the said coarser particles with water, concentrating the said extract, agitating said concentrated extract with an alcohol-water mixture where the alcohol is present in at least an equal amount with water, removing the precipitated residues, drying said residues, and then grinding the dried extracted material.

11. An extract of the coarse fraction of pulverized dehulled oats, said coarse fraction being substantially free of those particles which will go through a 60 mesh screen when the dehulled oats are pulverized to a fineness that will permit a major proportion thereof to pass through a 60 mesh screen, said coarse fraction having a relatively low starch and a relatively high protein content as compared to dehulled oats, said extract being soluble in a water-alcohol mixture comprising at least 5 parts of water to each part of the alcohol and, said extract being substantially insoluble in a mixture comprising at least 50% of the alcohol against the weight of the water.

12. An extract of the coarse fraction of pulverized dehulled oats, said coarse fraction being substantially free of those particles which will go through a 60 mesh screen when the dehulled oats are pulverized to a fineness that will permit about 80% to 90% thereof to pass through a 60 mesh screen, said extract being soluble in a mixture comprising at least 5 parts of water to each part of the alcohol and, said extract being substantially insoluble in a mixture comprising at least 50% of the alcohol against the weight of the water.

SIDNEY MUSHER.